United States Patent [19]

Takanashi et al.

[11] Patent Number: 5,122,895
[45] Date of Patent: Jun. 16, 1992

[54] POLARIZATION CONVERTER FOR CONVERTING RANDOMLY POLARIZED LIGHT TO LINEARLY POLARIZED LIGHT

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 623,236

[22] Filed: Dec. 4, 1990

[30] Foreign Application Priority Data

Dec. 5, 1989 [JP] Japan .................................. 1-316303

[51] Int. Cl.$^5$ .......................... G02B 27/28; G02F 1/03
[52] U.S. Cl. ..................................... 359/247; 359/251; 359/256
[58] Field of Search ...................... 350/96.14, 394, 397, 350/402, 403, 166, 401; 359/247, 251, 256

[56] References Cited

U.S. PATENT DOCUMENTS

| | | | |
|---|---|---|---|
| 2,274,110 | 2/1942 | Ward, Jr. | 350/401 |
| 2,447,828 | 8/1948 | West | 350/394 |
| 3,346,319 | 10/1967 | Billings | 350/394 |
| 3,353,894 | 11/1967 | Harris | 350/394 |
| 3,497,283 | 2/1970 | Law | 350/394 |
| 3,635,563 | 1/1972 | Mouchart | 350/394 |
| 3,753,608 | 8/1973 | Bernal . | |
| 3,767,290 | 10/1973 | Lang et al. | 350/397 |
| 3,876,285 | 4/1975 | Schwarzmuller | 350/401 |
| 4,425,028 | 1/1984 | Gagnon et al. | 350/394 |
| 4,560,999 | 12/1985 | Tokuhara | 350/401 |
| 4,564,931 | 1/1986 | O'Hara et al. | 350/401 |
| 4,930,878 | 6/1990 | Bergner et al. | 350/394 |
| 4,948,229 | 8/1990 | Soref | 350/96.14 |

OTHER PUBLICATIONS

"Fresnel Rhomb," *McGraw-Hill Dictionary of Scientific and Technical Terms*, p. 649.

Primary Examiner—Bruce Y. Arnold
Assistant Examiner—Martin Lerner
Attorney, Agent, or Firm—Michael N. Meller

[57] ABSTRACT

An efficiency polarization converter of few optical components for converting a randomly polarized light into a single beam of linearly polarized light, comprises a first optical device receiving the random light and projecting two linearly polarized lights one projected in a first direction, another to a second optical device which changes the polarization plane thereof, the polarization changes light being directed by a third optical device to the first direction, thereby the two linearly polarized light are combined and aligned to have a common polarization to become the single beam linearly polarized light projected in the first direction. Typical first optical device is a polarization beam splitter, a typical second optical device is a quarterwave plate with a mirror, a halfwave plate or a Fresnel rhomb with a mirror, or a photomodulation material interposed between biased electrodes with a mirror, a typical third optical device is a polarization beam splitter, a prism or a mirror. The first and third optical devices may be combined to a 3-prism structure. The polarization converter may be used with liquid crystal light modulators to utilize image display systems.

4 Claims, 6 Drawing Sheets

POLARIZATION CONVERTER FOR CONVERTING RANDOMLY POLARIZED LIGHT TO LINEARLY POLARIZED LIGHT

BACKGROUND OF THE INVENTION

The present invention relates to a polarization converter which converts a randomly polarized light into a linearly polarized light highly efficiently.

Recently, large screen image projectors utilizing light modulators of twisted nematic type liquid crystal are becoming popular. For this type of image projector, a linearly polarized light is needed as a projection light, the same is true for other type of image projectors utilizing an optical device having an electrooptic effect for the operation of the projectors.

In this regard, a conventional system to obtain such a linearly polarized light is that wherein a randomly polarized light generated from a high intensity light source such as an incandescent or arc lamp, is allowed to be passed through an optical analyzer. However, this conventional system is poor in efficiency as the energy of the utilizable linearly polarized light is less than a half of the energy of the original randomly polarized light.

Some improvements on this poor efficiency problem are disclosed in the following prior art:

(1) Polarization Converter Element for High Intensity Liquid Crystal Projection System, preprint No. 5–page 34 for the 1989 Fall Convention of The Institute of Electronics, Information and Communication Engineers, in which a P-polarized light is converted into an S-polarized light or vice versa by a total reflection system. (Note: P-polarized light is a linearly polarized light of which the plane of polarization is perpendicular to the plane of incidence of the light before conversion, whereas the S-polarized light is a linearly polarized light of which the plane of polarization is perpendicular to the P-polarized light.)

(2) Japanese Laid-open Patent Application No. 1 (1980)-201693 in which a P-polarized light and an S-polarized light are combined together after being modulated by respective liquid crystal modulators.

However, the system of the prior art (1) involves many optical components making the system too complicated. The P-polarized light and the S-polarized light produced in the system have their respective light paths different from each other which is liable to cause a disagreement between the two lights upon landing on the light modulator (liquid crystal panel) for image projection The system of the prior art (2) requires two independent light modulators (liquid crystal panels) to produce modulated light beams to be combined thereafter by a polarization beam splitter. Because of this optical arrangement, this system is liable to cause a disagreement between two images respectively produced by the two independent light modulators.

SUMMARY OF THE INVENTION

A primary object of the present invention is to provide an improved polarization converter which converts a randomly polarized light into a linearly polarized light highly efficiently using a minimum number of optical components.

According to one concept of the present invention, a first optical device receives a randomly polarized light from a light source and produces first and second linearly polarized lights having their polarization planes a predetermined angular relationship therebetween but advancing in first and second directions respectively. A second optical device changes the polarization plane of the second linearly polarized light into the same polarization plane as the polarization plane of the first linearly polarized light. A third optical device directs the polarization changed second linearly polarized light to the first direction so that a beam of linearly polarized light which is a combined product of the first and second linearly polarized lights projected in the first direction, is obtained.

In more specific aspects of the invention, the first optical device may be a polarization beam splitter comprising a pair of rectangular prisms combined together to form a 45 degree boundary plane between them which functions as a polarizer to produce the first and second linearly polarized lights. The second optical device may be a polarization converting device comprising a pair of electrodes, one of which is transparent, interposing a photomodulation layer and a mirror layer, a bias source providing an electric potential to the pair of electrodes, or a combination of a quarterwave plate and a mirror laminated thereto, or a combination of a Fresnel rhomb and a mirror provided thereto, or simply one halfwave plate. The third optical device may be a polarization beam splitter having the same structure as the one mentioned earlier, or one rectangular prism or simply one mirror aligned parallel with the 45 degree boundary plane. Further, the first and third optical devices may be combined into one optical block comprising top, center and bottom rectangular prisms stacked with respect to each other so as to form two polarizing boundary planes between the prisms having a 90 degree angular relationship between the two boundary planes A primary advantage of this invention is to provide a high efficiency polarization converter of few constituting optical components, which converts randomly polarized light into a beam of linearly polarized light without wasting virtually any energy of the original randomly polarized light incident to the polarization converter. The invention and its advantages will become more apparent from the detailed description of the invention presented below.

DETAILED DESCRIPTION OF THE PREFERRED EMBODIMENTS

Polarization converters according to the present invention will be described hereinbelow in detail with reference to the attached drawings.

Figure 1:
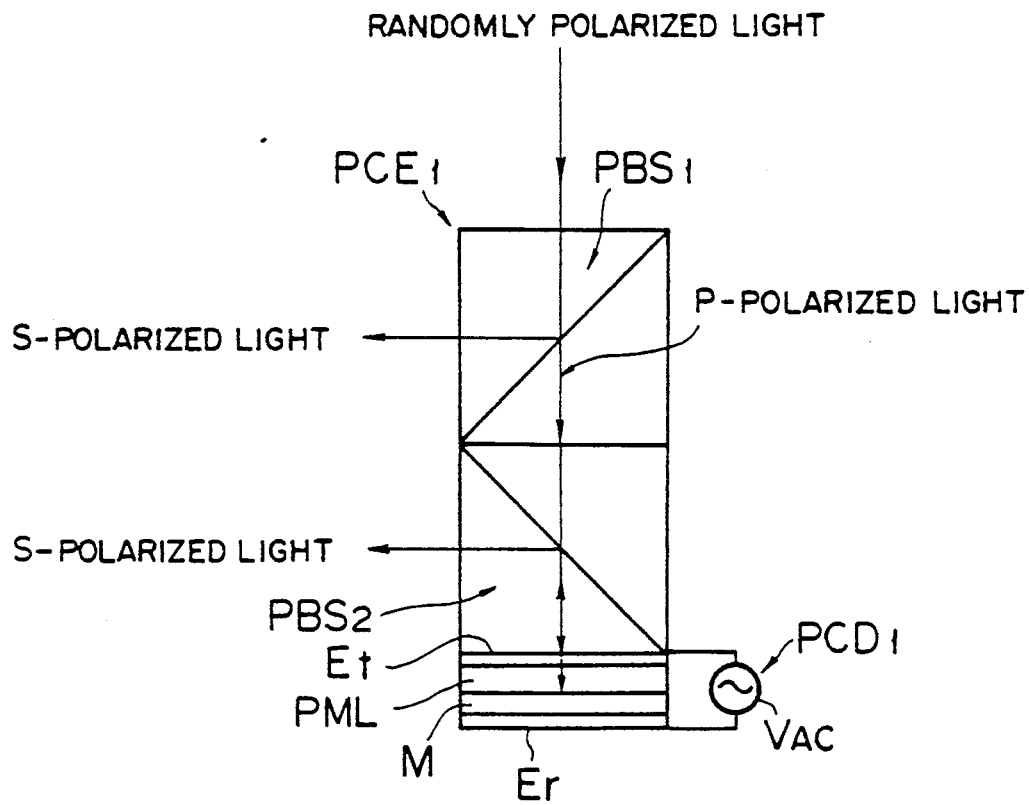
FIG. 1 is a diagrammatic representation of a polarization converter according to a first embodiment of the present invention.

In FIG. 1 a polarization converter $PCE_1$ comprises a first polarization beam splitter (first splitter) $PBS_1$ to a top plane of which a randomly polarized light from a light source (not shown) is incident. In contact with a bottom plane of the first polarization beam splitter is a second polarization beam splitter (second splitter) $PBS_2$. A polarization converting device $PCD_1$ comprising from a lop thereof a transparent electrode Et, a photomodulation layer member PML, a reflecting mirror layer (possibly dielectric mirror) M and an electrode Er, is further attached to a bottom plane of the second splitter. A bias potential is applied from an electric source $V_{ac}$ between the transparent electrode Et and the electrode Er to generate an electric field within the photomodulation layer member PML and the reflecting mirror layer M. A material of the photomodulation layer member PML may be lithium niobate ($LiNbO_3$), PLZT, twisted nematic liquid crystal or other materials having an electro-optic effect or birefringence. The bias potential from the electric source $V_{ac}$, the material and a thickness of the photomodulation layer member PML are so determined that the polarization converting device $PCD_1$ functions to convert a P(S)-polarized light incident thereto into an S(P)-polarized light.

The first and second splitters $PBS_1$ and $PBS_2$ are typically cubic optical blocks each being a pair of prisms combined together to form a 45° boundary plane where multiple layers of film are sandwiched to serve as a polarizer, further, the two optical blocks are so stacked with respect to each other that the two boundary planes of the respective splitters $PBS_1$ and $PBS_2$ form a right angle as shown in FIG. 1.

An operation of the first embodiment of the present invention is as follows:

The randomly -polarized light (random light) enters the first splitter $PBS_1$, through the top plane thereof. An S-polarized light component of the entered random light is reflected at the boundary plane to exit from the left (in FIG. 1) plane of the first splitter $PBS_1$, whereas a P-polarized light component of the entered random light is allowed to pass through the first splitter $PBS_1$ and advance into the second splitter $PBS_2$ then to the polarization converting device $PCD_1$ through the transparent electrode Et thereof The P-polarized light (component) is converted into an S-polarized light as explained previously when the entered light travels through the transparent electrode Et, the photomodulation layer member PML, reflecting mirror layer M where the light is reflected back to the photomodulation layer member PML and to the transparent electrode Et.

Accordingly the light converted into the S-polarized light reenters the second splitter $PBS_2$ through the bottom plane thereof and is reflected by the boundary plane thereof to exit from the left (in FIG. 1) plane thereof. As a result, the S-polarized light projected from the second splitter $PBS_2$ advances parallel with the S-polarized light projected from the first splitter $PBS_1$ forming together a single beam of linearly polarized light (S-polarized light) advancing towards the left in FIG. 1.

It should be noted that the electrode Er can be made of an electroconductive mirror so that the reflecting mirror layer M can be omitted from the polarization converting device $PCD_1$. The same can be applied to the electrode Er shown in FIG. 2.

Figure 2:
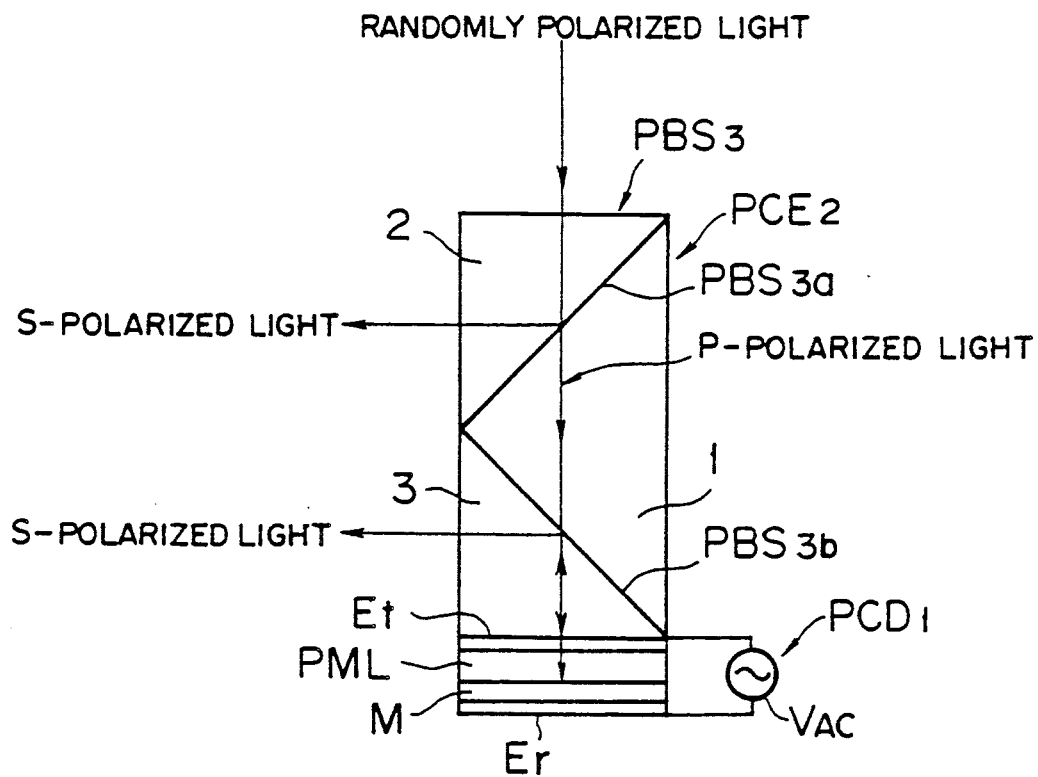
FIG. 2 is a diagrammatic representation of a polarization converter according to a second embodiment of the present invention, which is a modified version of the first embodiment shown in FIG. 1.

Referring now to FIG. 2, in the second embodiment of the present invention, a feature of a polarization beam splitter $PBS_3$ is a stacked structure of three rectangular prisms such that a bottom half (prism) of the cubic shape first splitter $PBS_1$ and a top half (prism) of the cubic shape second splitter $PBS_2$ in FIG. 1 are combined to form a single piece of center prism 1. This leaves a top prism 2 and a bottom prism 3 of the respective first and second splitter $PBS_1$ and $PBS_2$ in FIG. 1. Further both boundary planes thereof remain and function in the same manner as they do in FIG. 1. The polarization converting device $PCD_1$ remains unchanged. Since the polarization converter $PCE_2$ of the second embodiment operates exactly in the same manner as the first embodiment does, a detailed operation of the second embodiment is omitted.

Figure 3:
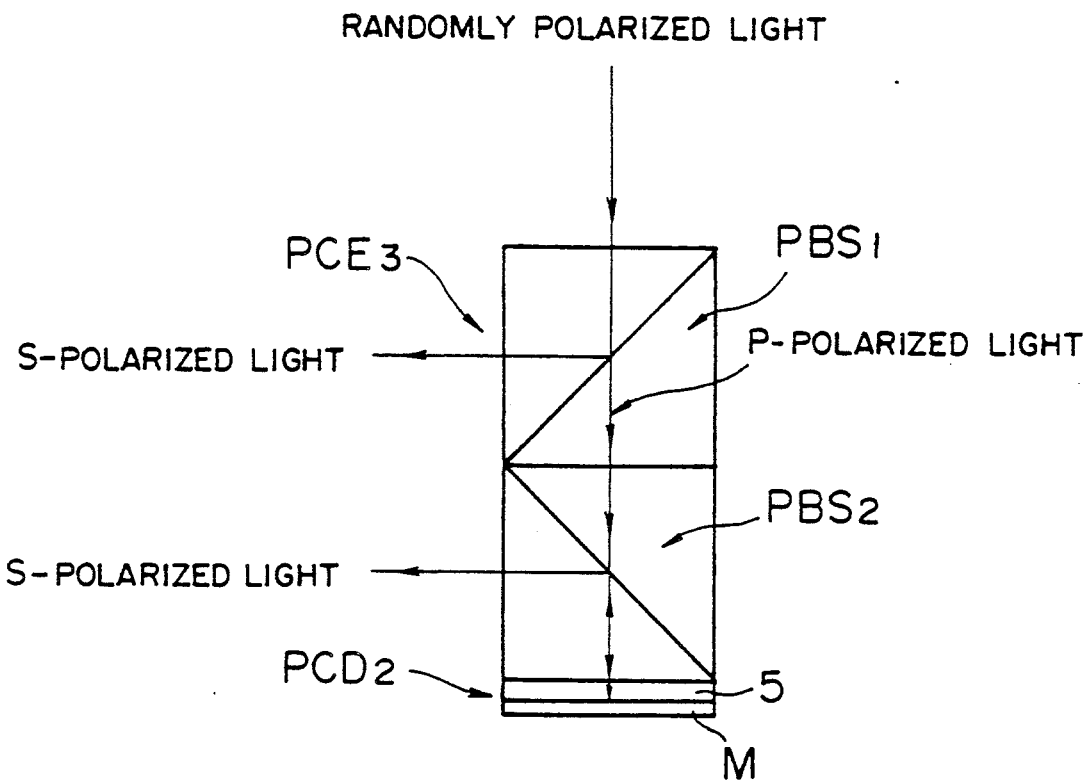
FIG. 3 is a diagrammatic representation of a polarization converter according to a third embodiment of the present invention, which is a modified version of the first embodiment.

In FIG. 3 which shows a third embodiment of the present invention, a polarization converter $PCE_3$ includes the same components shown in FIG. 1 except the polarization converting device $PCD_1$ is replaced with a polarization converting device $PCD_2$. The polarization converting device $PCD_2$ has a laminated structure of a $\lambda/4$ wave plate 5 and a reflecting mirror layer M and is in contact with the bottom plane of the second splitter $PBS_2$. The P-polarized light incident to the polarization converting device $PCD_2$ from the second splitter $PBS_2$ is converted to a S-polarized light as it travels within the polarization converting device $PCD_2$, the light converted to the S-polarized light reenters the second splitter $PBS_2$, the rest of the operation is identical to the operation of the first embodiment. Naturally, bottom and top prism sections of respective first and second splitters $PBS_1$, and $PBS_2$ can be made of a single piece of center prism 1 as shown in FIG. 2.

Figure 4:
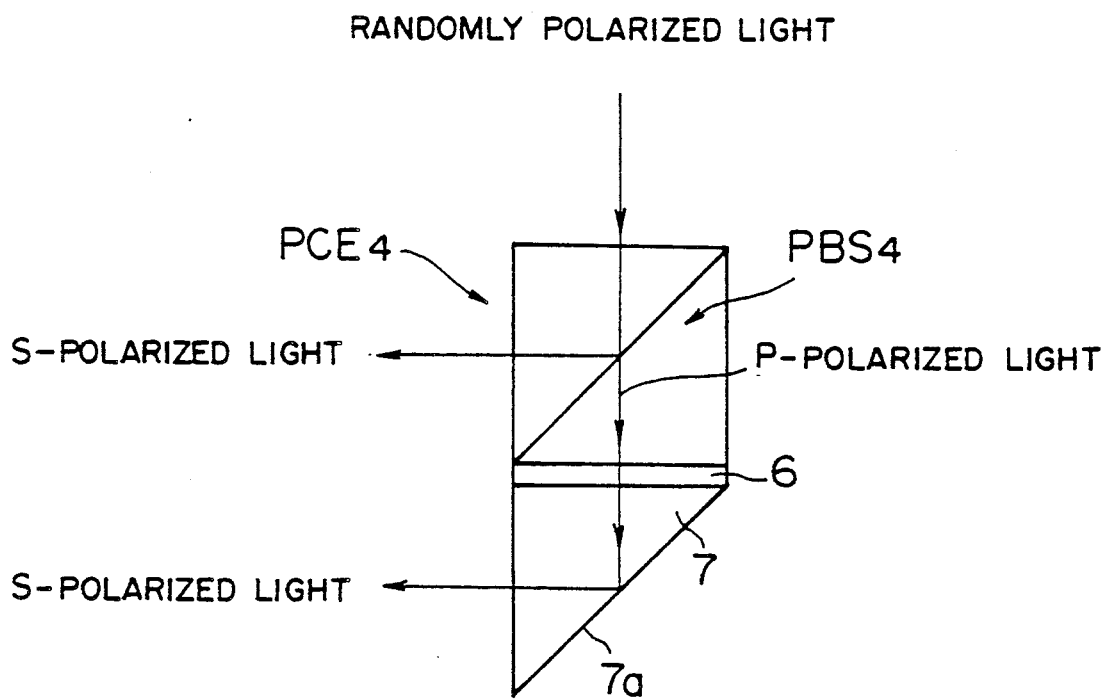
FIG. 4 is a diagrammatic representation of a polarization converter according to a fourth embodiment of the present invention.

FIG. 4 shows a polarization converter $PCE_4$ which is a fourth embodiment of the present invention, in which a halfwave plate 6 is sandwiched between a polarization beam splitter (splitter) $PBS_4$ and a prism 7. A structure of the splitter $PBS_4$ is similar to the first splitter $PBS_1$ and a boundary plane of which is aligned parallel to a reflective plane $7a$ of the prism 7. The splitter $PBS_4$ functions as the first splitter $PBS_1$ does in FIG. 1 regarding a randomly polarized light incident to a top plane thereof, i.e. the splitter $PBS_4$ projects an S-polarized light to the left in FIG. 4 and passing a P-polarized light toward the halfwave plate 6 where the P-polarized light is converted into an S-polarized light which is in turn directed to the left by the reflective plane $7a$ to form a single beam of linearly polarized (S-polarized) light together with the S-polarized light from the splitter PBS₄.

Figure 5:
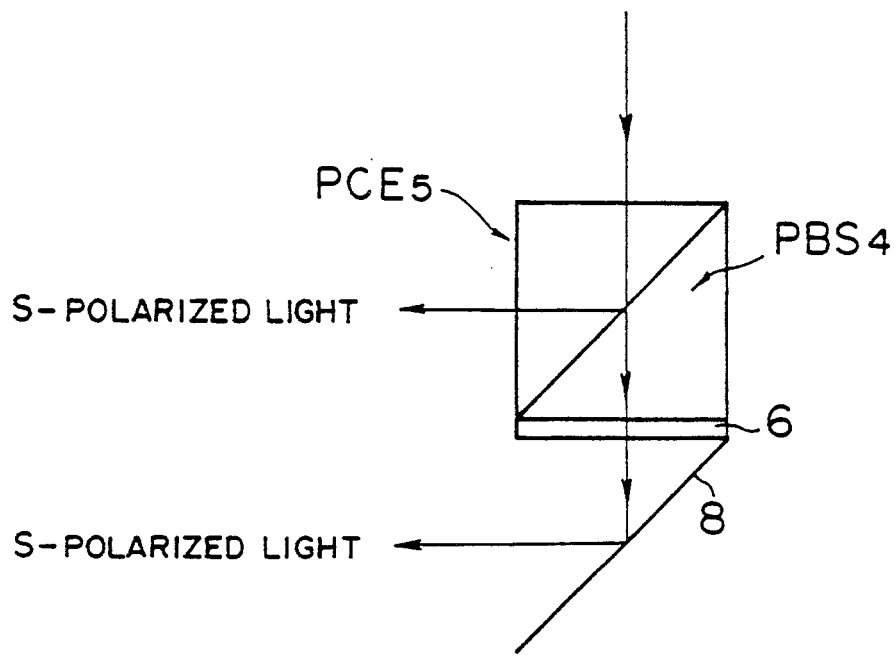
FIG. 5 is a diagrammatic representation of a polarization converter according to a fifth embodiment of the present invention, which is a modified version of the fourth embodiment.

FIG. 5 is a fifth embodiment of the present invention, which is a modified version of the one shown in FIG. 4, i.e. the prism 7 is replaced with a reflective mirror 8 in FIG. 5, which is aligned parallel with the boundary plane of the splitter PBS₄. This polarization converter PCE₅ operates in the same manner as the polarization converter PCE₄ shown in FIG. 4.

Figure 6:
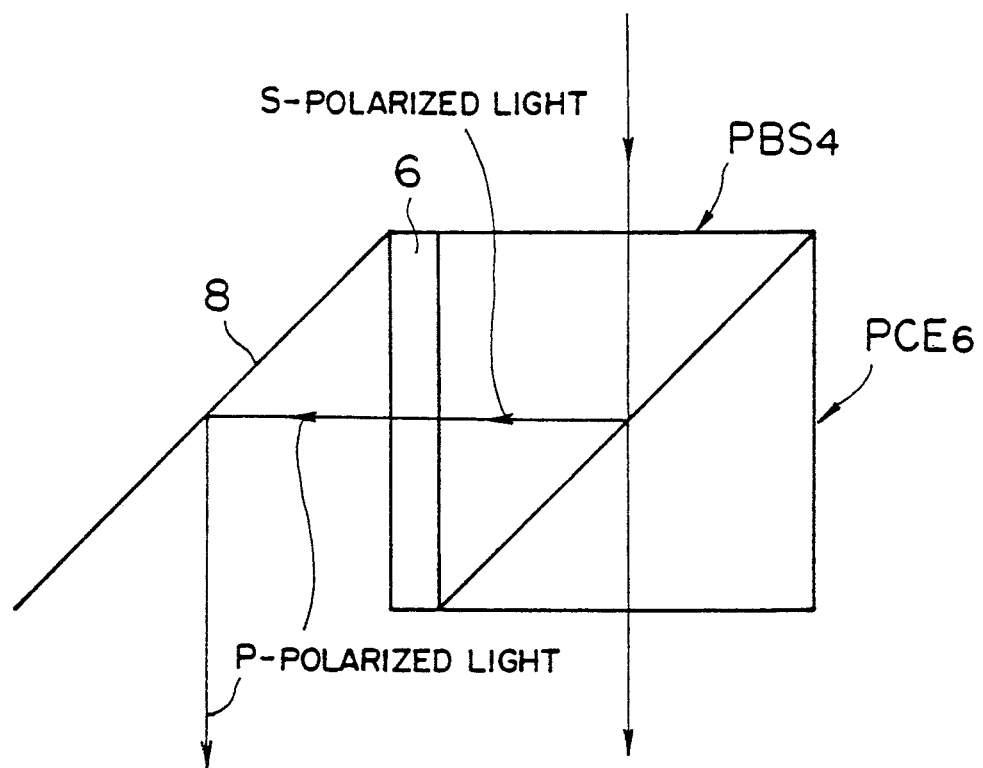
FIG. 6 is a diagrammatic representation of a polarization converter according to a sixth embodiment of the present invention, which operates differently from the fifth embodiment.

The polarization converter PCE₅ can be operated differently as shown in FIG. 6 as PCE₆ which is a sixth embodiment of the present invention. In this configuration, the incident randomly polarized light is projected parallel to an extending direction of the halfwave plate 6 of the splitter PBS₄, a P-polarized light component of the incident light continues to advance along a path of the incident light and is projected out of the splitter PBS₄. On the other hand, an S-polarized light component reflected at the boundary plane of the splitter PBS₄ advances perpendicular to the halfwave plate 6 where it is converted to a P-polarized light, which is in turn directed by the reflective mirror 8 to project parallel with the P-polarized light component explained before. As a result, a single beam of linearly polarized light projected along the path of the incident randomly polarized light, is obtained Note that the single beam of linearly polarized light consequently obtained in the embodiments 1 through 5, projects perpendicular to a direction of the incident randomly polarized light, whereas such single beam is parallel in the sixth embodiment, this increases the flexibility of image projector designs.

Figure 7:
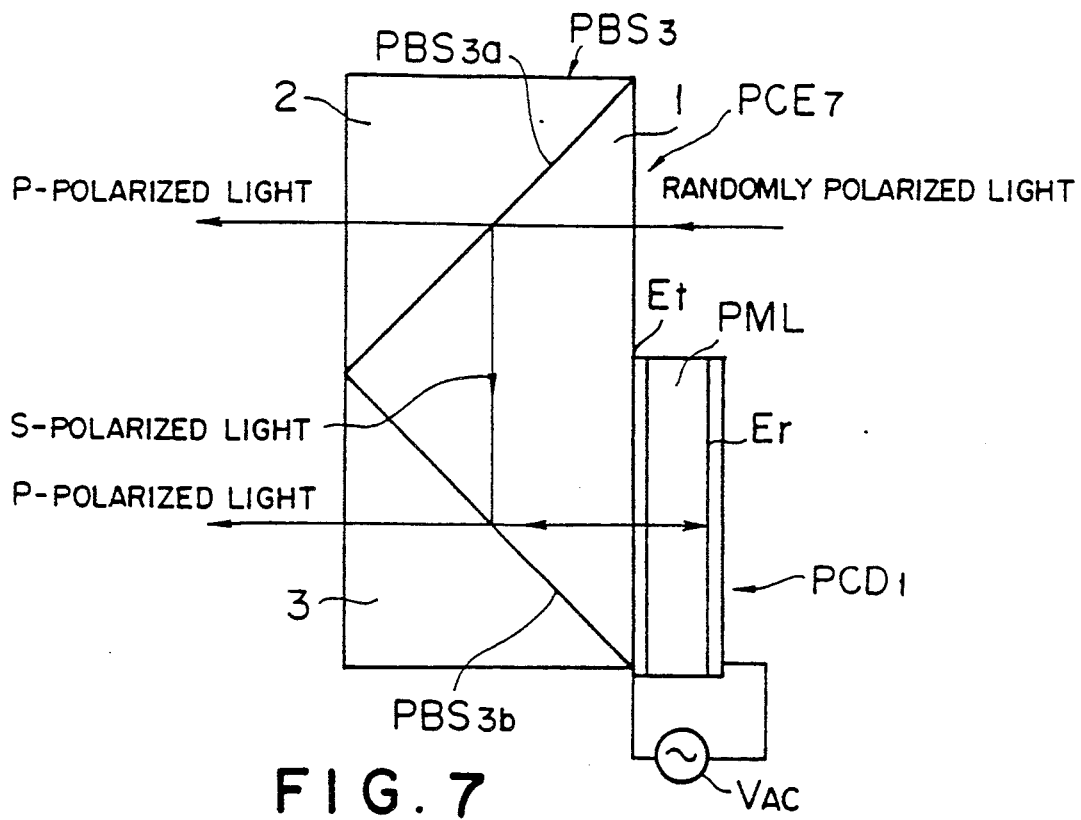
FIG. 7 is a diagrammatic representation of a polarization converter according to a seventh embodiment of the present invention in which the same polarization converter shown in FIG. 6 is used but is operated differently.

FIG. 7 shows a seventh embodiment of the present invention, in which the same polarization beam splitter PBS₃ shown in FIG. 2, is used, the polarization converting device PCD₁ is attached to a lower right plane of the center prism 1. In the polarization converting device PCD₁, the electrode Er is the type of electroconductive mirror explained previously.

In this embodiment, a randomly polarized light (random light) is introduced to the upper half of the center prism 1 to hit an upper boundary plane PBS₃ₐ through an upper right plane of the center prism 1. A P-polarized light component (P-polarized light) of the random light continues to advance along a path thereof and is projected out of the splitter PBS₃ passing through the upper boundary plane PBS₃ₐ and the prism 2, whereas an S-polarized light component (S-polarized light) of the random light is reflected and directed by the upper boundary plane PBS₃ₐ toward a lower boundary plane PBS₃ᵦ which is at right angles to the upper boundary plane PBS₃ₐ. In turn, the S-polarized light is reflected by the lower boundary plane PBS₃ᵦ toward the polarization converting device PCD₁ and is reflected back to the splitter PBS₃ by the electrode Er formed of an electroconductive mirror. When the S-polarized light travels within the polarization converting device PCD₁, it is converted to P-polarized light and is projected out of the splitter PBS₃ passing through the lower boundary plane PBS₃ᵦ and the bottom prism 3. As shown in FIG. 7 the splitter PBS₃ and the polarization converting device PCD₁ are so arranged that the P-polarized light thus converted and projected, advances parallel with the P-polarized light projected through the top prism 2 to form a single beam of linearly polarized (P-polarized) light altogether.

Note that the splitter PBS3 can be replaced with a pair of the first and second splitters PBS₁ and PBS₂ shown in FIG. 1 or FIG. 3.

Figure 8:
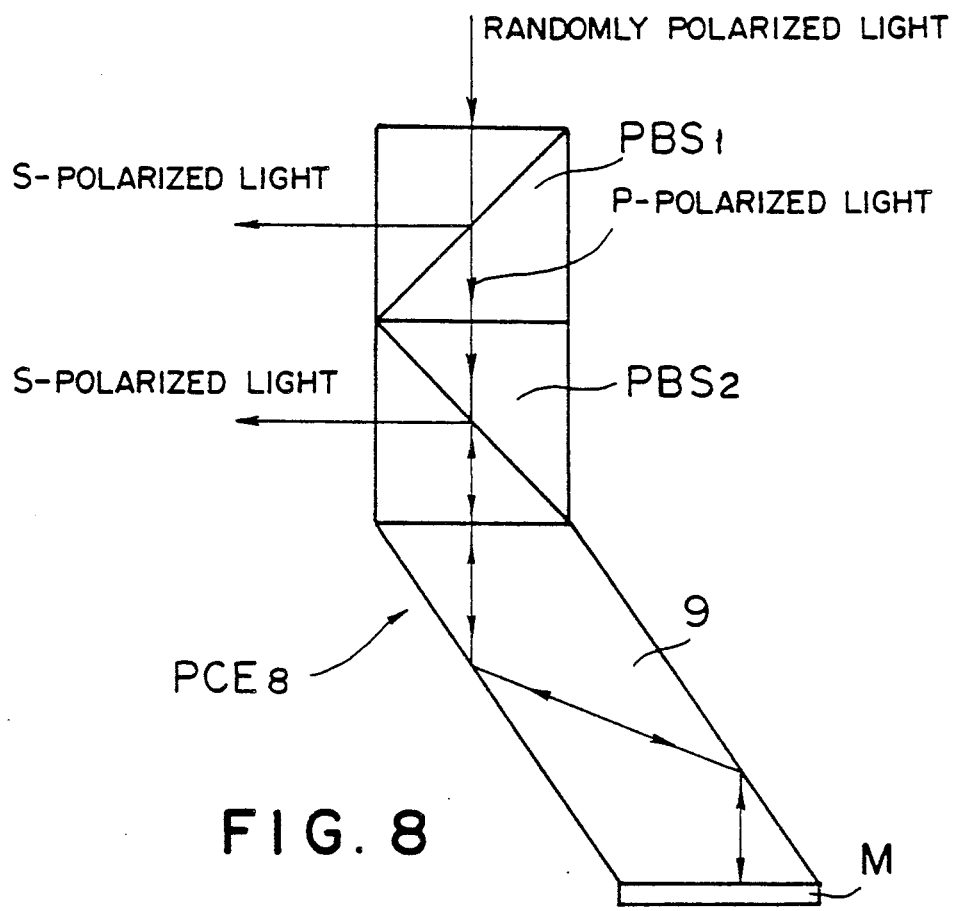
FIG. 8 is a diagrammatic representation of a polarization- converter according to an eighth embodiment of the present invention, which is a modified version of the third embodiment

FIG. 8 shows a polarization converter PCE₈ which is an eighth embodiment of the present invention. In FIG. 8 the first and second splitters PBS₁ and PBS₂ in the first embodiment as per FIG. 1 are employed. The first splitter PBS₁ receives a randomly polarized light and projects an S-polarized light to the left as in the first embodiment. A Fresnel rhomb 9 is attached to a bottom of the second splitter PBS₂. A reflecting mirror layer M the same as the one in the polarization converting device PCD₁, is provided at the bottom of the Fresnel rhomb 9. The Fresnel rhomb 9 together with the mirror M serves as a polarization converting device which functionwise replaces the polarization converting device PCD₁ of the polarization converter PCE₁ in FIG. 1. When the P-polarized light projected from the second splitter PBS₂ is projected normal to a top plane of the Fresnel rhomb 9 and travels within the Fresnel rhomb 9, it is reflected by the mirror M and is converted into an S-polarized light. It is then projected back into the second splitter PBS₂ retracing a light path along which the P-polarized light advances through the second splitter PBS₂ and enters the Fresnel rhomb 9. As a result, the S-polarized light reentry the second splitter PBS₂, is directed to the left by the boundary plane thereof and advances parallel with the S-polarized light projected from the first splitter PBS₁ to form a single beam of linearly polarized (S-polarized) light together.

Note that the pair of first and second splitters PBS₁ and PBS₂ can be replaced with the polarization beam splitter PBS₃ shown in FIG. 2 or FIG. 7 to perform the same function. Further, a polarization beam splitter comprises generally a plurality of prisms and multiple layers of film composed by evaporation between the prisms, which are referred as the boundary plane in the explanations for the various embodiments. However, a glass plate on which multiple layers of film are composed by evaporation may also be used for the purpose.

From the foregoing, it can be understood that the polarization converters of the present invention uses a small number of optical components to change or produce a linearly polarized light beam efficiently.

FIGS. 9 to 12 show some forms of display system using a polarization converter PCE according to the present invention. The polarization converter PCE can be any one of the polarization converters PCE₁ through PCE₅ and PCE₈ which receive a randomly polarized light from first direction and project a beam of linearly polarized light in another direction which is 90° to the first direction. If the randomly polarized incident light comes in the same direction as the linearly polarized light beam which is intended to project out of the polarization converter PCE, the polarization converter PCE₆ or PCE₇ may be utilized in the display systems shown in FIGS. 9, 11, and 12.

Figure 9:
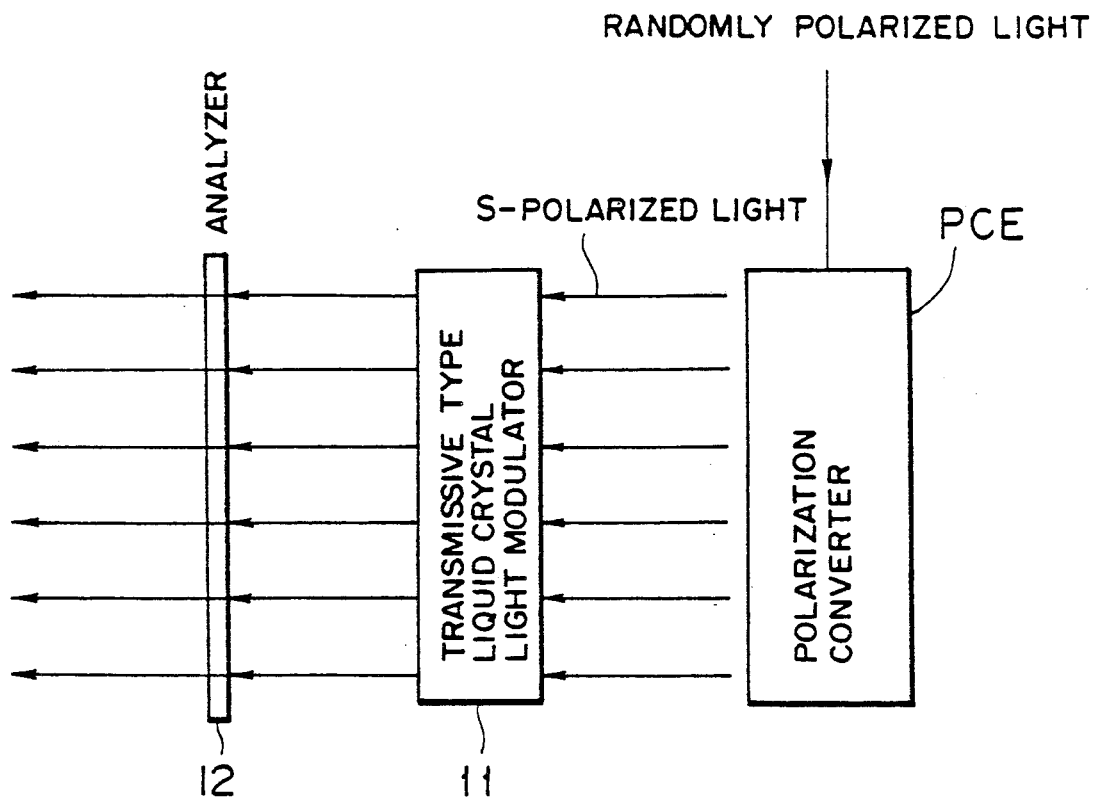
FIGS. 9 to 12 are respective diagrammatic representations of display systems using a polarization converter of the present invention.

In FIG. 9, a randomly polarized light is converted to a beam of S-polarized light and is projected toward a transmissive type liquid crystal light modulator 11 where the S-polarized light beam undergoes polar modulation. Further, the light thus modulated advances through an analyzer 12 to undergo brightness modulation. The brightness modulated light thus obtained may be projected on a screen (not shown) through a projector lens (not shown) for display.

Figure 10:
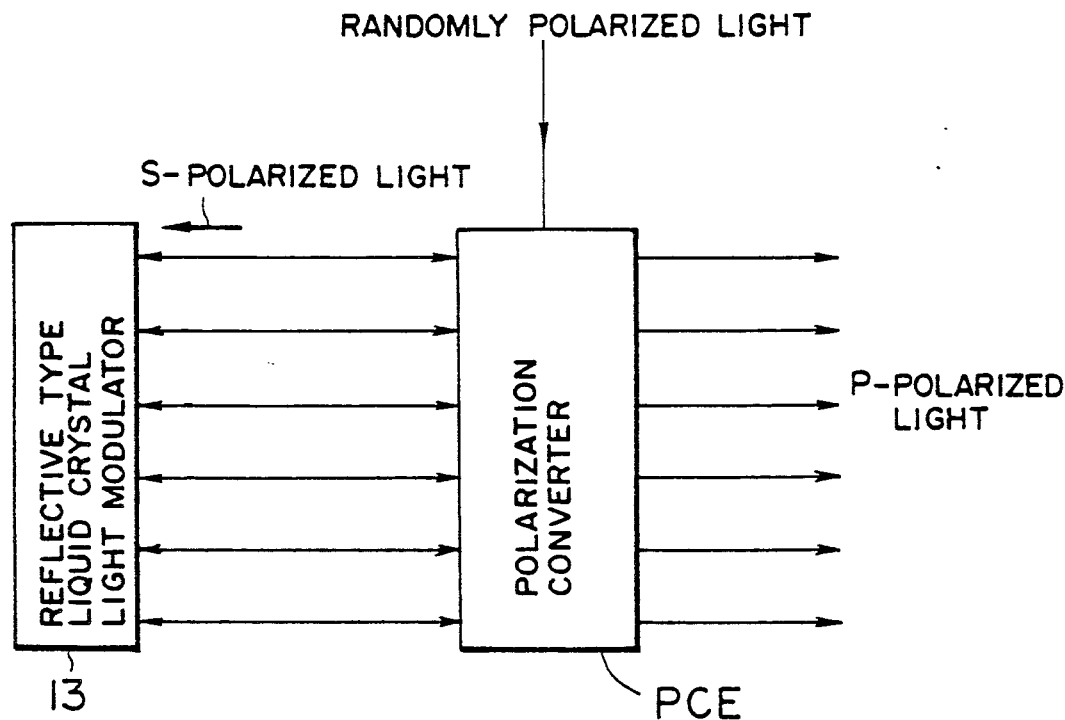

In FIG. 10, a reflective type liquid crystal light modulator 13 is used in place of the liquid crystal light modulator 11 in FIG. 9. As a result, a polar modulated light from the liquid crystal light modulator 13 is projected back to the polarization converter PCE which serves as an analyzer to pass only a P-polarized light component of the polar modulated light. The output P-polarized light may be projected on a screen through a projector lens (both not shown) for display.

Figure 11:
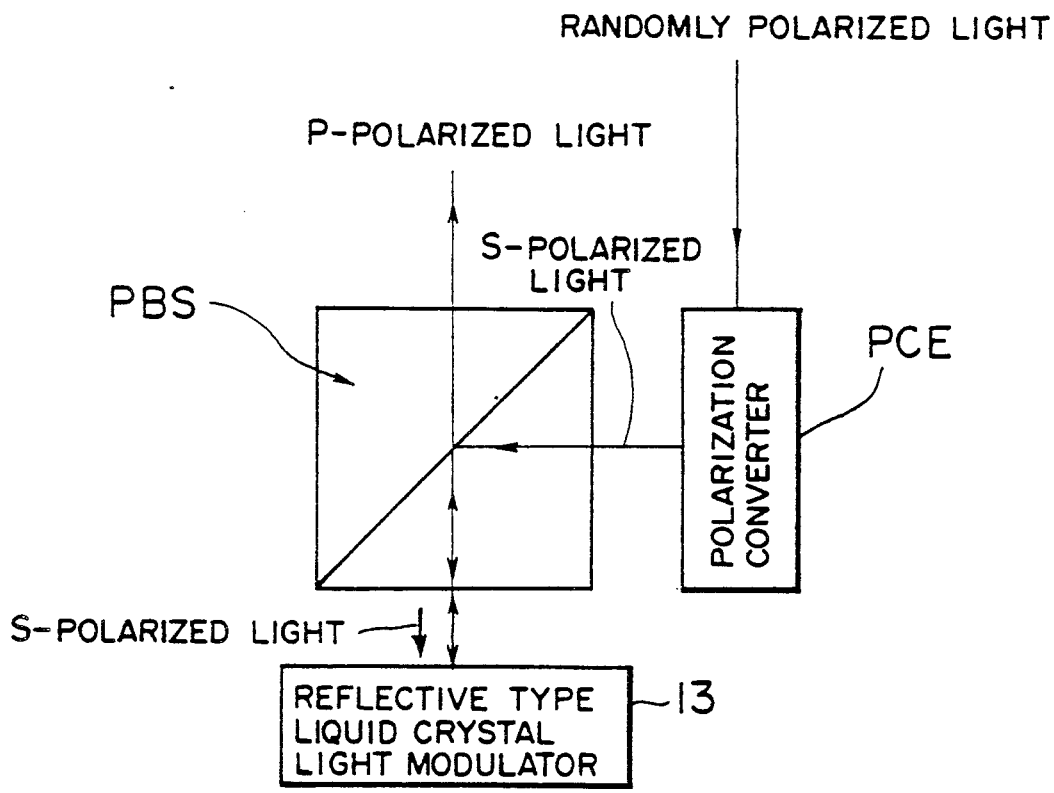

In FIG. 11, the S-polarized light produced by the polarization converter PCE is projected to a polarization beam splitter PBS which is identical in structure to the first polarization beam splitter $PBS_1$ referred in FIG. 1, which, directs the S-polarized light to the reflective type liquid crystal light modulator 13. Where the S-polarized light undergoes polar modulation and is reflected back to the polarization beam splitter PBS. As a result, only a P-polarized light component is passed through the polarization beam splitter PBS, which may be projected on a screen through a projector lens (both not shown) for display.

Figure 12:
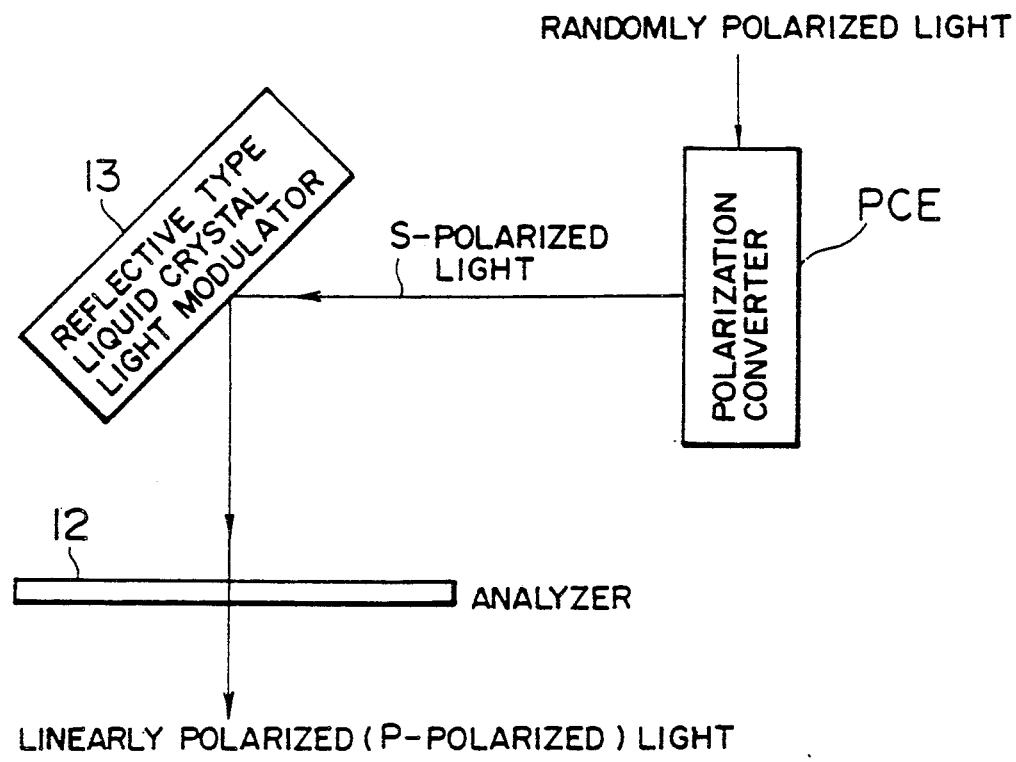

In FIG. 12, the S-polarized light produced by the polarization converter PCE is projected toward the reflective type liquid crystal light modulator 13. The modulator 13 is aligned 45° to a path of the S-polarized light incident thereto, polar-modulates the S-polarized light, and directs it to the analyzer 12 for brightness modulation thereby. As a result, a brightness modulated linearly polarized (P-polarized) light beam is projected on a screen through a project or lens (both not shown) for display.

Note that unlike the embodiment shown in FIG. 10, the polarization converter PCE in FIGS. 9, 11, and 12 does not have the role of analyzer. The liquid crystal light modulator of a type transmissive (11) or reflective (13) is typically a twisted nematic type liquid crystal. However, other types of light modulators having a polarization or a birefringence characteristic such as lithium niobate or PLZT material, may be utilized. Further, the polarization converters of the present invention may be applied to not only image display systems but to other systems such as light computers and recording/playback systems.

What is claimed is:

1. A polarization convertor for producing a beam of linearly polarized light from a randomly polarized light comprising:
   first means for receiving the randomly polarized light, out of which said first means projects first polarized light in a predetermined direction, and projects a second polarized light having a predetermined angular relationship with said first polarized light;
   second means for converting said polarized light into a third polarized light, a polarization of which is identical to said first polarized light;
   third means for producing said beam of linearly polarized light advancing in said predetermined direction by directing said third polarized light parallel with said first polarized light;
   said second means being a Fresnel rhomb and a mirror provided to one end thereof, and another end of said Fresnel rhomb being attached to said third means;
   said first polarized light and said third polarized light are together projected outside of said polarization convertor in said predetermined direction.

2. A polarization converter for producing a beam of linearly polarized light from a randomly polarized light comprising:
   first means for receiving the randomly polarized light, out of which said first means projects first polarized light in a predetermined direction, and projects a second polarized light having a predetermined angular relationship with said first polarized light;
   second means for converting said polarized light into a third polarized light, a polarization of which is identical to said first polarized light;
   third means for producing said beam of linearly polarized light advancing in said predetermined direction by directing said third polarized light parallel with said first polarized light, wherein;
   said first polarized light and said third polarized light are together projected outside of said polarization convertor in said predetermined direction;
   said first means is a polarization beam splitter comprising a pair of prisms combined together forming a 45 degree boundary plane therebetween, which functions as a polarizer; and
   said polarization convertor further comprises an additional polarization beam splitter as said third means having an identical structure to said polarization beam splitter, said additional polarization splitter and said polarization splitter being stacked together in such a manner that respective boundary planes thereof form a right angle.

3. A polarization convertor for producing a beam of linearly polarized light from a randomly polarized light comprising:
   first means for receiving the randomly polarized light, out of which said first means projects first polarized light in a predetermined direction, and projects a second light having a predetermined angular relationship with the first polarized light;
   second means for converting said polarized light into a third polarized light, a polarization of which is identical to said first polarized light;
   third means for producing said beam of linearly polarized light advancing in said predetermined direction by directing said third polarized light parallel with said first polarized light, wherein;
   said first polarized light and said third polarized light are together projected outside of said polarization convertor in said predetermined direction; and
   further comprising a three prism structure as said first and third means in such a configuration that three prisms are stacked to form two boundary planes having a 90 degrees angular relationship therebetween, and each of the boundary planes functions as a polarizer.

4. A polarization converter as claimed in claim 3, in which said three prism structure has a top, center and bottom prism stacked together, an upper half of the center prism receives said randomly polarized light and transmit thereof to the top prism to produce said first polarized light, and said second means is attached to a lower half of the center prism and projects said third polarized light toward the bottom prism.

* * * * *